United States Patent [19]

Araki

[11] 4,387,975
[45] Jun. 14, 1983

[54] AUTOMATIC FOCUSING POSITION DETECTION APPARATUS

[75] Inventor: Kunihiko Araki, Tokyo, Japan

[73] Assignee: Ricoh Company, Ltd., Japan

[21] Appl. No.: 201,528

[22] Filed: Oct. 28, 1980

[30] Foreign Application Priority Data

| Oct. 31, 1979 [JP] | Japan | 54-141107 |
| Nov. 26, 1979 [JP] | Japan | 54-152731 |
| Nov. 26, 1979 [JP] | Japan | 54-152732 |
| Dec. 3, 1979 [JP] | Japan | 54-156657 |

[51] Int. Cl.³ .......................... G03B 3/00; G01J 1/44
[52] U.S. Cl. ............................................ 354/25; 250/201
[58] Field of Search ................. 354/25 R, 25 A, 25 P, 354/197, 31; 352/140; 355/56; 250/201, 204; 356/1, 4

[56] References Cited

U.S. PATENT DOCUMENTS

| 4,080,531 | 3/1978 | Stauffer | 354/25 P X |
| 4,157,217 | 6/1979 | Isono | 354/25 |
| 4,182,563 | 1/1980 | Bizer et al. | 354/197 |
| 4,189,232 | 2/1980 | Asano et al. | 250/201 X |
| 4,218,119 | 8/1980 | Schickedanz | 354/25 X |
| 4,240,726 | 12/1980 | Wick | 354/25 P |
| 4,257,705 | 3/1981 | Hosoe et al. | 354/25 A |

*Primary Examiner*—William B. Perkey
*Attorney, Agent, or Firm*—Guy W. Shoup; Eliot S. Gerber

[57] ABSTRACT

An automatic focusing position detection apparatus of a double image overlapping type having a plurality of photoelectric element groups capable of detecting rays of light from an object separately, which can detect the focusing position from the output signals from the photoelectric element groups, and which includes a shifting circuit capable of shifting the output signals from one photoelectric element group relative to the output signals of other photoelectric group, and a circuit for calculating the defocusing distance by obtaining the correlation degree of the output signals of the photoelectric element groups which are shifted relatively to each other by the shifting circuit, and by obtaining the shift distance by the shifting circuit.

8 Claims, 26 Drawing Figures

AUTOMATIC FOCUSING POSITION DETECTION APPARATUS

BACKGROUND OF THE INVENTION

The present invention relates to an automatic focusing position detection apparatus for use in optical instruments including cameras, and more particularly to an automatic focusing position detection apparatus of a double image overlapping type.

Conventionally, as the automatic focusing position detection apparatuses of the double image overlapping type, an automatic focusing position detection apparatus having an optical system of a trigonometrical survey type, which is capable of detecting the focusing position by moving mirrors, for instance, Visitronic Auto Focus Module made by Honeywell Co., Ltd., and an automatic focusing position detection apparatus of a TTL (Through the Taking Lens) type by use of an exit pupil divisional type taking lens, in which the taking lens or photoelectric element groups are moved forwardly or backwardly to find the focusing postition are known. However, in such automatic focusing position detection apparatuses, the focusing position can be detected, but the shift distance from the focusing position, namely the defocusing distance, cannot be measured and it is required that the mirror, the taking lens or the photoelectric element groups have to be moved to find the focusing position.

SUMMARY OF THE INVENTION

According to the invention, an automatic focusing position detection apparatus of the double image overlapping type can be provided, which is capable of measuring the defocusing distance from correlation degree of the output signals from a plurality of photoelectric element groups which are relatively shifted and from the shift distance thereof.

In an embodiment of an automatic focusing position detecting apparatus according to the invention, it can be detected to what extent the mirrors or the taking lens should be moved to find the focusing position even if the mirrors or the taking lens has been located at any position. If the correlation degree is calculated by determining the difference between the outputs of each pair of photoelectric element and multiplying each difference and integrating the same, a plurality of focusing positions can be determined with respect to a three-dimensional object and, by selecting one focusing position in accordance with a mode setting signal, the focusing position can be set at either a far position or a near position of the three-dimensional object. Furthermore, if the correlation degree is calculated by multiplying the difference of two alaternate pairs of signals and integrating the same, an intermediate position of the three-dimensional object in the far and near direction thereof can be also detected. Furthermore, by selective use of the above-mentioned two methods in accordance with their respective mode setting signals, the focusing position of any kind can be detected. In such an automatic focusing position detection apparatus of the invention, the value of the defocusing signal relative to the defocusing distance is varied by switching F-number mode.

Therefore, another embodiment of an automatic focusing position detection apparatus of the invention is not affected by switching F-number mode.

In a further embodiment of the invention, the taking lens is moved in accordance with a defocusing signal which corresponds to the shift distance (i.e., the defocusing distance) from the focusing position of the taking lens, and a charge coupled device (CCD) is employed as the distance measurement sensor and the output of the charge coupled device is made constant by extending the integration time of the CCD when the brightness of an object is low. In this embodiment, the time required for calculating the defocusing signal from the output of the CCD is not negligibly short, the time interval between the generation of the defocusing signals is long. Therefore, the defocusing signal includes some errors if the taking lens is moved while the distance measurement is being done, so that the taking lens has to be stopped during the distance measurement. As a result, comparatively long time is required for finding the focusing position.

From this point of view, in still another embodiment of the invention, the errors of the distance measurement which are generated by the movement of the taking lens are detected and are then automatically corrected, whereby the necessity for stopping the taking lens during the distance measurement is removed, shortening the time required for finding the focusing position.

In a further embodiment of the invention, the outputs from the photoelectric element groups are employed as the inputs to an exposure control system, whereby the distance measurement for detecting the focusing position and the exposure measurement for controlling exposure can be performed simultaneously at the same position. As a result, the automatic focusing position detection apparatus can be made inexpensive and compact in size and its performance can also be improved.

Therefore, an object of the present invention is to provide an automatic focusing position detection apparatus capable of measuring the defocusing distance.

Another object of the invention is to provide an automatic focusing position detection apparatus of the type described, which is capable of selectively setting the focusing position at a near position, a far position and an intermediate position with respect to a three-dimensional object.

A further object of the invention is to provide an automatic focusing position detection apparatus of the type described which is not affected by the switching of F-number mode.

Still another object of the invention is to provide an automatic focusing position detection apparatus of the type described which is capable of automatically correcting the errors in the distance measurement which are caused during the movement of the taking lens.

Still another object of the invention is to provide an automatic focusing position detection apparatus of the type described in which the outputs from the photoelectric element groups in the focusing position detection system are employed as the inputs to the exposure control system.

Additional and other objects of the invention will become apparent from the description set forth hereinafter when considered in conjunction with the accompanying drawings.

DETAILED DSCRIPTION OF THE EMBODIMENTS

Figure 1:
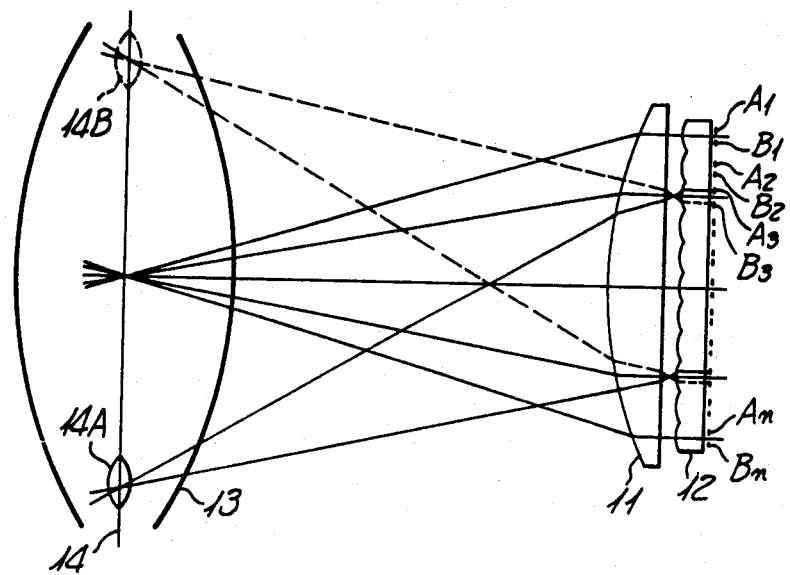
FIG. 1 is a schematic view of an optical system for use in an automatic focusing position detecting apparatus of a pupil divisional type TTL system, to which the invention can be applied.

Referring to FIG. 1, there is diagrammatically shown an optical system for use in an automatic focusing position detection apparatus of a pupil divisional type TTL (Through the Taking Lens) system. In FIG. 1, an exit pupil 14 of a taking lens 13 is divided by a pupil divisional type optical system comprising a group of small lenses 12 and a condenser lens 11. Image formation rays of light of the taking lens 13, which pass through portions 14A and 14B of the exit pupil 14, respectively enter photoelectric elements $A_1$-$A_n$ of Group A and photoelectric elements $B_1$-$B_n$ of Group B. More specifically, the photoelectric elements $A_1$ and $B_1$, $A_2$ and $B_2$, ..., $A_n$ and $B_n$ each constitute a pair. Of the rays of light which enter a focusing position detection surface in which the photoelectric elements $A_1$-$A_n$ and $B_1$-$B_n$ are arranged, the image formation rays of light which pass through the portion 14A of the exit pupil 14 enter the photoelectric elements $A_1$-$A_n$ of the photoelectric element pairs in the respective small lens in the small lens group 12. Likewise, the image formation rays of light, which pass through the portion 14B of the exit pupil 14, enter the photoelectric elements $B_1$-$B_n$ of the photoelectric element pairs in the respective small lenses in the small lens group 12.

Figure 2:
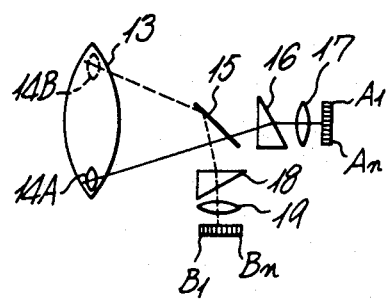
FIG. 2 is a schematic view of another optical system for use in an automatic focusing position detection apparatus of a pupil divisional type TTL system, to which the invention can be applied.

Referring to FIG. 2, the image formation rays of light, which have passed through the portion 14A of the exit pupil 14, pass through a half-mirror 15, a prism 16 and an image formation lens 17 and enters the photoelectric elements $A_1$-$A_n$. On the other hand, the image formation rays of light, which pass through the portion 14B of the exit pupil 14, are reflected from the half-mirror and pass through a prism 18 and an image formation lens 19 and then enter the photoelectric elements $B_1$-$B_n$.

Figure 3:
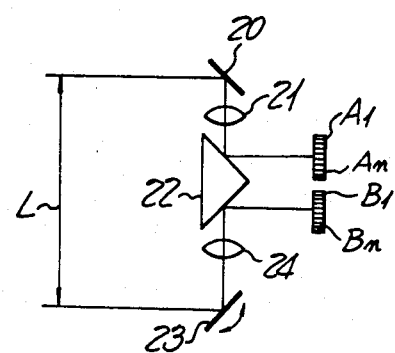
FIG. 3 is an optical system for us in an automatic focusing position detection apparatus of a trigonometrical survey type, to which the present invention can be applied.

Referring to FIG. 3, the rays of light from an object are reflected from a mirror 20 and enter the photoelectric elements $A_1$-$A_n$ via a lens 21 and a prism 22. Furthermore, the rays of light from the object are also reflected from a mirror 23 and enter the photoelectric elements $B_1$-$B_n$ via a lens 24 and the prism 22. In FIG. 3, L represents the length of the basic line of the object.

In the optical systems in FIGS. 2 and 3, as the photoelectric elements $A_1$-$A_n$ and $B_1$-$B_n$, photodiode arrays, CCD, BBD or the like can be used.

Figure 4A:
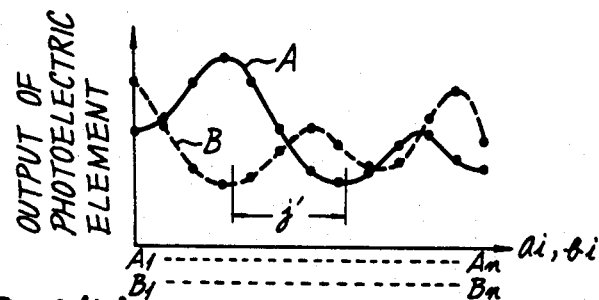
FIGS. 4(a) and 4(b) are the graphs showing the phase differences of the outputs of each photoelectric element group of an optical system of automatic focusing position detection apparatus, to which the invention can be applied.
Figure 4B:
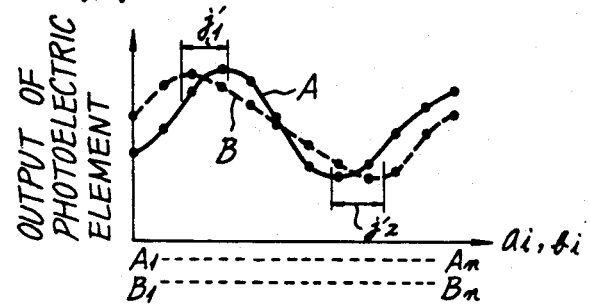

The focusing point can be obtained at a position in which the double images completely overlap, where a phase shift j' of phase patterns Ⓐ and Ⓑ are formed by the outputs of the photoelectric elements $A_1$-$A_n$ of Group A and the photoelectric elements $B_1$-$B_n$ of group B. Suppose the phase patterns Ⓐ and Ⓑ are as shown in FIG. 4 when the focusing position is located at a certain position, the defocusing distance e can be determined by detecting the phase shift j' of the patterns Ⓐ and Ⓑ. In the case of a two-dimensional (plane) object, one phase shift j' is determined as shown in FIG. 4(a). However, in the case of a three-dimensional object, a plurality of phase shift values can be determined, for example, two shaft values $j_1'$ and $j_2'$ in FIG. 4(b).

In order to obtain the shift values j' from the outputs of the photoelectric elements $A_1$-$A_n$ and from the photoelectric elements $B_1$-$B_n$, the outputs $a_1$-$a_n$ of the photoelectric elements $A_1$-$A_n$ and the outputs $b_1$-$b_n$ of the photoelectric elements $B_1$-$B_n$ are each stored in the form of a sequence of numbers in a memeory, and one sequence is shifted relative to the other sequence, so that the correlation degree between the two sequences is tested. In order to test the correlation degree, the following equation $$Y_1 = \Sigma(a_i - b_i)^q$$

or $$Y_2 = \Sigma\{(a_i - b_{i+1})^p - (a_{i+1} - b_i)^p\}$$

can be employed, where P = 1, 2, 3, ..., when P is odd, $$Y_1 = \Sigma |a_i - q_i|^q$$

and $$Y_2 = \Sigma\{|a_i - b_{i+1}|^p - |a_{i+1} - b_i|^p\}.$$

Figure 5A:
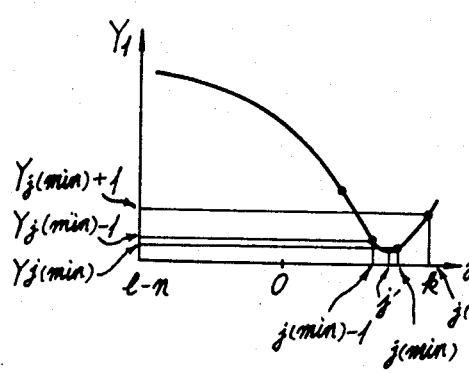
FIGS. 5(a), 5(b) and 5(c) are the graphs showing the calculated results of the correlation degrees of the outputs of each photoelectric element group in an automatic focusing position detection apparatus according to the invention.
Figure 5C:
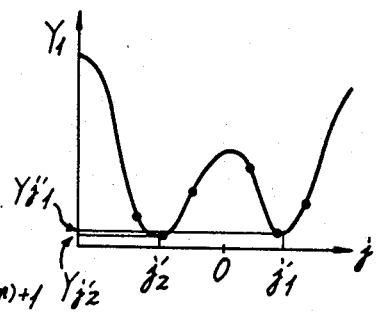
Figure 5B:
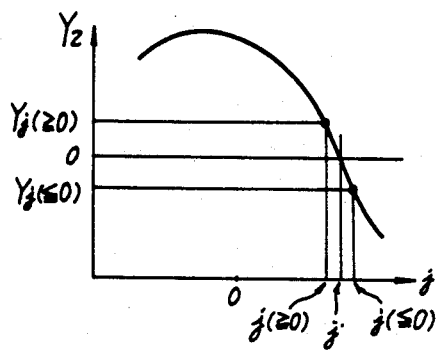
Figure 5D:
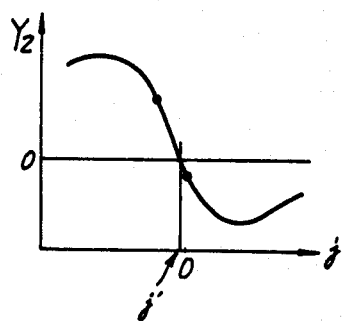

The correlation degrees, $Y_1$ and $Y_2$, between the outputs of the photoelectric elements $A_1-A_n$ and the outputs of the photoelectric elements $B_1-B_n$ shown in FIG. 4, which were obtained by use of the above-mentioned equations, are shown in FIGS. 5(a), 5(b) and 5(c). FIGS. 5(a) and 5(b) show the results of the operation in the case of a two-dimensional object in FIG. 4(a), while FIGS. 5(c) and 5(d) show the results of the operation in the case of the three-dimensional object, a plurality of shift values j' are formed and all the shift values j' can be checked from the results of the operation of Equation $Y_1$. Furthermore, from the results of the operation of Equation $Y_2$, the shift value j' at an intermdeiate position of the three-dimensioned object with respect to the far and near directions from the taking lens to the object can be obtained.

Figure 6:
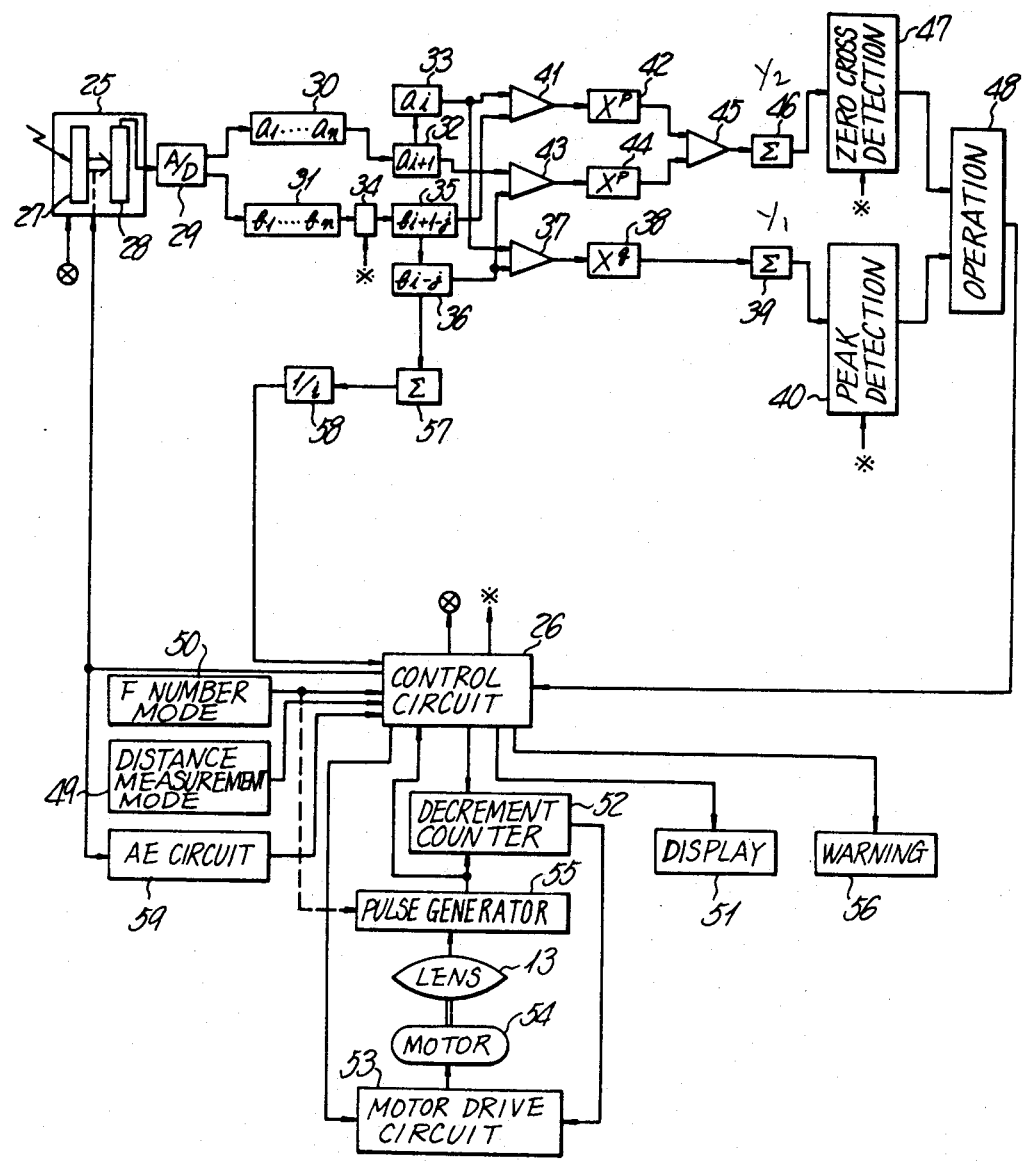
FIG. 6 is a block diagram of a circuit of an automatic focusing position detection apparatus according to the invention.

Referring to FIG. 6, there is shown a circuit diagram of an embodiment of an automatic focusing position detection apparatus according to the invention.

In this embodiment, the focusing point between optical system shown in FIG. 1 is employed, and as the photoelectric elements $A_1-A_n$, and photoelectric elements $B_1-B_n$, a charge coupled device CCD 25 is employed. The charge coupled device CCD 25 is actuated by a control circuit 26 and each ray of light which enters the charge coupled device 25 is photoelectrically converted and integrated by a photosensor group 27 which is equivalent to the groups of the photoelectric elements $A_1-A_n$ and $B_1-B_n$. Thus, the photoelectrically converted and integrated values are transffered in a parallel manner to a shift register 28 and are then output therefrom in a serial manner. The output signals $a_1-a_n$ and $b_1-b_n$ from the charge coupled device CCD 25 are input to an A/D converter 29 and are converted to digital signals by the A/D converter 29 and are then stored in memories 30 and 31. In this case, the signals $a_1-a_n$ from the photoelectric elements $A_1-A_n$ of Group A are stored in the memory 30 and at the same time, the signals $b_1-b_n$ from the photoelectric elements $B_1-B_n$ of group B are stored in the memory 31. The output signals of the memory 30 are transferred to a memory 32 and are then transferred to a memory 33. On the other hand, the output signals of the memory 31 are output to a shift circuit 34, where the output signals of the memory 31 are shifted relative to the output signals of the memory 30, and are then transferred to a memory 35 and to a memory 36. The memories 30–33, 35 and 36 are each constructed so as to be capable of storing one word therein. Therefore, if the signal stored in the memory 33 is $a_i$, the content stored in the memory 32 is $a_{i+1}$ and the contents of the memories 35, 36 are respectively $b_{i+1-j}$ and $b_{i-j}$, where j represents a shift made by the shift circuit 34. The difference between the output signal of the memory 33 and the output signal of the memory 36 is determined by a differential circuit 37, and the output signal of the differential circuit 37 is input to a multiplication circuit 38, where the output signal of the differential circuit 37 is raised to the qthe power. The output of the multiplication circuit 38 is input to an integration circuit 39 and is integrated there, whereby the operation of $Y_1 = \Sigma(a_i - b_{i-j})^q$ is performed. This operation is performed with respect to each shift value j, so that the control circuit 26 changes the shift value j successively. A peak detection circuit 40 detects such values as $Y_j(\min)-1$, $Y_j(\min)$ and $Y_j(\min)+1$ near the peak values of the output signals of the integration circuit 39 as in FIG. 5(a), and the corresponding shift values $j(\min)-1$, $j(\min)$ and $j(\min)+1$. On the other hand, the difference between the output signal of the memory 33 and the output signal of the memory 35 is determined by a differential circuit 41, and the output of the differential circuit 41 is input to a multiplication circuit 42, where the output of the differential circuit 41 is raised to the pth power. Furthermore, the difference between the output signal of the memory 32 and that of the memory 36 is determined by a differential circuit 43. The output of the differential circuit 43 is input to a multiplication circuit 44, where that output is raised to the pth power. The difference between the output of the multiplication circuit 44 and that of the multiplication circuit 42 is determined by a differential circuit 45. The output of the differential circuit 45 is integrated by an integration circuit 46, performing the operation of $$Y_2 = \Sigma\{(a_i - b_{i+1-j})^p - (a_{i+1} - b_{i-j})^p\}.$$

This operation is performed with respect to each shift value j. A zero cross detection circuit 47 detects such values as $$y_j(\geq 0) \text{ and } Y_j(\leq 0)$$

in the zero neighborhood of the output signal of the integration circuit 46 is FIG. 5(b) and the corresponding shift values, $$j(\geq 0) \text{ and } j(\leq 0).$$

By a j' operation circuit 48, the value j' and value $Y_1(j'_1, Y_{j'1})$ at the peak position and the value $j'_2$ of j' at the zero cross position are obtained from the outputs of a peak detection circuit 40 and from the outputs of the zero cross detection circuit 47. Stated differently, with respect to the outputs of the peak value detection circuit 40, $(j(\min)-1, Y_j(\min)-1)$, $(j(\min), Y_j(\min))$, $(j(\min)+1, Y_j(\min)+1)$, a quadratic curve represtend by an approximate quadratic equation $$Y = Cj^2 + Dj + E$$

is obtained from the above-mentioned values by the j' operation circuit 48, and the value j' and the value j'1 of $$Y_1\left(= -\frac{D}{2C}\right)$$

at its peak position, and $Y_{j'1}$ are calculated, and with respect to the outputs of the zero cross detection circuit 47, $(j(\geq 0), Y_j(\geq 0)$ and $(j(\leq 0), Y_j(\leq 0))$, they are linearly approximated, so that $$j'_2 = j(\geq 0) - \frac{j(\geq 0) - j(\leq 0)}{Y_j(\geq 0) - Y_j(\leq 0)} \times Y_j(\geq 0)$$

is calculated.

With respect to the three-dimensional object, there are a plurality of j'1 values. If design is such that the farther the object is located, the smaller the value j'1 becomes, like $j'_{1-1} > j'_{1-2} > \ldots j'_{1-n}$, and small j value is selected, the focusing point of a far object can be detected, while when a great value j'1 is selected, the focusing point of a near object can be detected. Furthermore, by selecting the minimum $Y_{j1}$ by the control circuit 26, the value $j'_1$ with the maximum correlation degree can be selected. The value $j'_2$ represents the average position of the distribution of far and near, three-dimensional objects. When three modes, far mode, near mode and average mode are provided as distance measurement modes for obtaining the focusing point, j' can be selected by the control circuit 26 in accordance with each mode setting signal from a distance measurement mode setting portion 49, whereby the automatic focusing position detection apparatus can cope with any object. Under the far mode, the control circuit 26 selects a smaller $j'_1$ value, while under the near mode the control circuit 26 selects a greater $j'_1$ value. Furthermore, under the average mode, the control circuit 26 selects $j'_2$. Normally, $j'_1$ is selected, which corresponds to the minimum $Y_{j1}$ value.

When the peak detection is performed by the peak detection circuit 40, the shifting direction of the signals $b_1-b_n$ to be shifted by the shift circuit 34 is determined by the control circuit 26, based on the increase or decrease of the putputs $Y_1$ of the integration circuit 39, which is detected by shifting the signals $b_1-b_n$ by one stage. However, in the case of the three-dimensional object, the peak value $Y_1$ is not limited to one as shown in FIG. 5(c). Therefore, it is required that the shifting be performed substantially. When the zero cross detection is performed by the zero cross detection circuit 47, the shifting direction can be determined so as to decrease the shift distance by the control circuit 26 by judging the polarity (positive or negative) of the value $Y_2$, without shifting the signals $b_1-b_n$ (even if j=0).

At the second distance measurement and subsequent distance measurements, in which the taking lens position differs from that at the first distance measurement, since the shift value j' does not become greater than the preceding shift value, so long as the taking lens is moved in the focusing direction at the first distance measurement, the maximum shift value can be determined by the control circuit 26. Thus, by determining the shift direction and shift distance, the operation speed can be increased.

Figure 7:
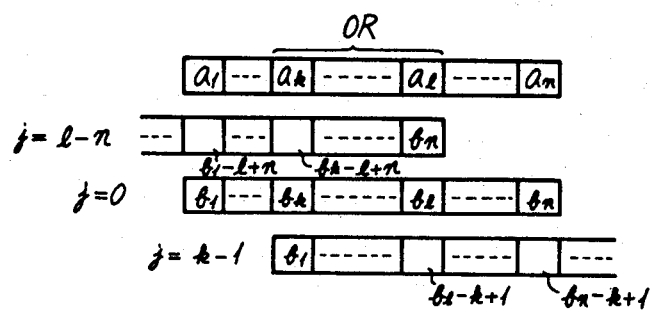
FIG. 7 is a diagram in explanation of the operation range of the circuit shown in FIG. 6.

The above-mentioned operation is in the range, or of $a_k-a_l$, which is also in the same range obtained by shifting the signals $b_1-b_n$ in the range of $1-n \leq j \leq k-1$ as shown in FIG. 7. The maximum shift value j is determined, in accordance with the maximum projection distance of the taking lens employed, and normally, it is $|1-n|=|k-1|$.

Figure 8:
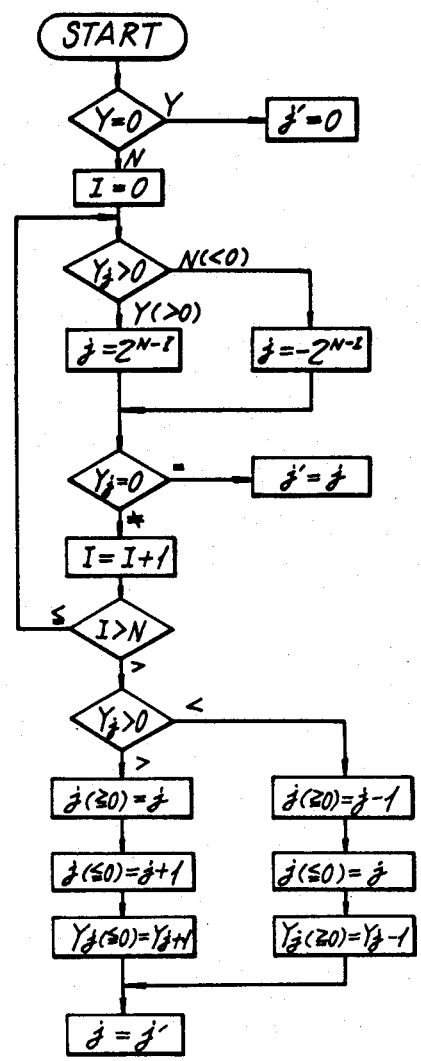
FIG. 8 is a flow chart showing a zero cross detecting operation of the circuit in FIG. 6.

FIG. 8 is a flow chart showing the zero detecting operation. Since the maximum shift value $j_{max}$ is proportional to the maximum lens projection distance of the taking lens, and the operation range is that shown in FIG. 7, and the relationship between j and $Y_2$ is that shown in FIG. 5(b), the shift of the signals $b_1-b_n$ is determined so as to be minimum in accordance with a binary classification method (i.e., successive comparison method), $-(l-n)+k-1=J=j_{max}/2 \leq 2^N$. When the output $Y_j$ of the integration circuit 46 is 0 (zero), j'=0 since the taking lens is located at the focusing position. If $Y_j$ is not 0 (zero), parameter I is reset and the direction and distance of the shift are determined, depending upon the polarity (positive or negative) of $Y_j$. When $Y_j=0$, j=j', so that the shifting is completed. If $Y_j \neq 0$, the shift value is increased and the above-mentioned operation is performed again. When the shift value becomes maximum, j' is determined by the value $Y_j(\leq 0)$ or $Y_j(\leq 0)$ of the output signal of the integration circuit 46 in the zero neighborhood, the shift value $j(\geq 0)$ or $j(\leq 0)$, and by the following equation:

$$j' = j(\geq 0) - \frac{j(\geq 0) - j(\leq 0)}{Y_j(\geq 0) - Y_j(\leq 0)},$$

where $Y_j(\geq 0)$ and $Y_j(\leq 0)$ are closest in value to each other in the zero neighborhood, and $j(\geq 0)$ and $j(\leq 0)$ correspond to the above-mentioned respective shift values.

The control circuit 26 serves to determine a defocus distance e from the thus selected j' and a F-number mode signal which is output from F-number setting portion 50 and to display the determined defocus distance e on a display apparatus 51, while setting the defocus distance e in a decrement counter 52, inputting a rotation direction signal and a speed signal to a motor drive circuit 53 and driving a motor 53, whereby the taking lens 13 is moved. A pulse generator 55 generates pulses which are proportional in number to the movement distance of the taking lens 12, and decrement of the decrement counter 52 is performed by the pulses generated. When the decrement counter 52 indicates 0, it inputs a stop signal to the motor drive circuit 53, stopping the motor 54, so that the taking lens 13 is stopped at the focusing position. In accordance with the F-number mode signal generated from the F-number mode setting portion 50, the control circuit 26 corrects a defocus signal or the number of pulses to be generated by the pulse generator 55, which corresponds to the movement distance of the taking lens 13, is controlled, so that the relationship between j' and e is made constant, irrespective of the switching of the F-number mode. During the focusing operation, the control circuit 26 causes a warning apparatus 56 to display a warning. The output signals of the memory 36 are integrated by the integration circuit 57 and the integrated value is divided by the number of signals, i, by a division circuit 58, that is the operation of $\Sigma bi/i$ is performed, so that the brightness of the object is measured. The control circuit 26 controls the integration time of the charge-coupled device CCD 25 in accordance with the output signal of the division circuit 58 and, at the same time, calculates the exposure by applying a photometric exposure control in accordance with the output of the automatic exposure circuit 59.

Figure 9A:
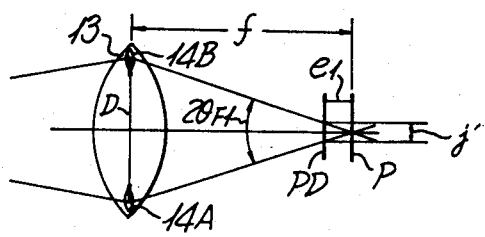
FIGS. 9(a) and 9(b) are the diagrams in explanation of the change in defocusing distance when F-number changes.
Figure 9B:
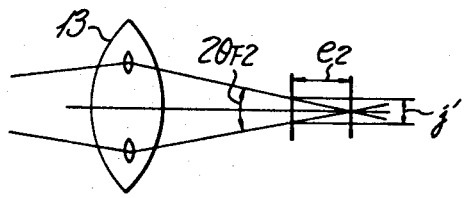

In the TTL type focusing point detection optical system, the following relationship holds between j' and e:

$$e \propto \frac{j'}{2\theta_F} = j' \times F$$

where $$D = \frac{f}{F} \doteq 2\theta_F \times f,$$

and F is F-number at the measurement of the distance, D is the effective diameter of the exit pupil at the measurement of the distance, f is the focal length of the taking lens 13, and 2F is the angle formed between the line connecting the exit pupil 14A and the focusing position and the line connecting the exit pupil 14B and the focusing position as shown in FIGS. 9(a) and 9(b). The defocusing distance e is the distance from the focusing plane P to the focusing detection plane PD.

Figure 10A:
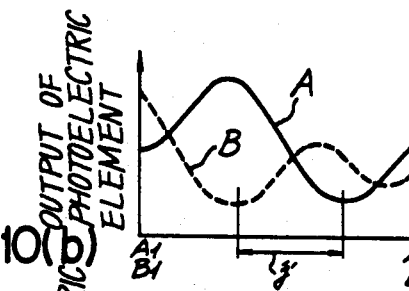
FIGS. 10(a), 10(b) and 10(c) are the graphs showing that the phase shift changes as F-number changes.
Figure 10B:
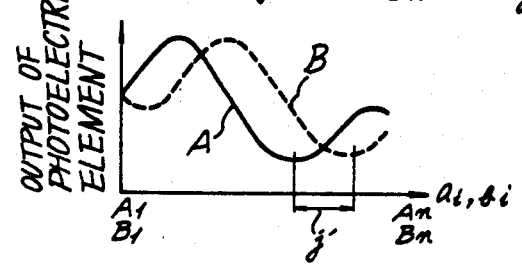
Figure 10C:
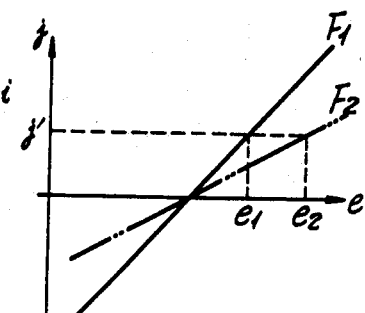

When the focusing position is not changed, but F is changed from $F_1$ to $F_2$ in accordance with the switching of the F-number mode, j' is also changed. For example, when $F_2 > F_1$, j' decreases from the value shown in FIG. 10(a) to the value shown in FIG. 10(b). On the other hand, when the focusing position at $F_1$ differs from that at $F_2$, and j' is constant as shown in FIG. 10(c), the defocusing distance e is changed from $e_1 = j' \times F_1$ to $e_2 = j' \times F_2$.

From the above, it can be said that the defocusing signal is obtained from j' and therefore the defocusing signal changes if j changes due to the change of F.

The switching of the F-number mode is one of the functions of the automatic focusing position detection apparatus for the purpose of not excluding the rays of light for measurement of the distance depending upon the F-number of the taking lens 13 or of changing the focusing accuracy for example, in accordance with the F-number at the time of photographing which is set in accordance with the automatic exposure operation. In the optical system shown in FIG. 1, the switching of the F-number mode is performed by changing the pitch between the paired photoelectric elements $A_i$ and $B_i$, or by changing the distance between the lens group 12 and the plane of the photoelectric elements $A_1$-$A_n$ and $B_1$-$B_n$ or by changing the focal length of the lens group 12. In the case of the optical system shown in FIG. 2, the switching of the F-number mode is performed by changing the vertical angles of the prisms 16, 18.

The relationship between the defocusing signal and the projecting distance of the taking lens 12 can be made constant by multiplying the defocusing signal by $F_2/F_1$ under $F_2$ mode, whereby the same relationship between the defocusing signal and the projection distance of the taking lens 13 as that under $F_1$ mode can be obtained. The same thing can also be attained by changing the number of pulses to be generated by the pulse generator for detecting the movement distance of the taking lens 13, relative to the movement distance of the taking lens 13, or by changing the gain of the motor drive circuit 53 relative to the defocusing signal. In the basic line measurement type focusing position detection optical system shown in FIG. 3, the following relationship holds between the length of the basic line L and e: $e \alpha j'/L$.

Figure 11:
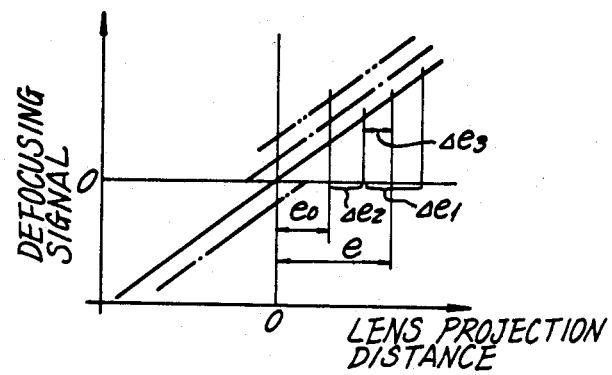
FIG. 11 is a graph showing the relationship between defocusing signals and the projection distance of a taking lens.

In the taking lens is not driven during the distance measurement procedure, the defocusing signal corresponding to j' is parallel to the lens projection distance as shown by the solid line in FIG. 11. However, if the taking lens is driven during the distance measurement procedure, errors are contained in the defocusing signal and accordingly the value of the defocusing signal deviates from its true value by the movement of the lens during the distance measurement procedure. The errors of the defocusing signal include the error $\Delta v_1/\alpha$ in accordance with the movement distance $e_1$ of the taking lens during the integration time of the CCD for distance measurement and the error $\Delta v_2$ in accordance with the movement distance $\Delta e_2$ of the taking lens during period fo time which is required for calculating the defocusing signal from the output signals of the CCD, where $\alpha$ is a value which is determined by the change of the speed of the lens. When the taking lens is driven at a constant speed, the defocusing signal includes the error due to $\Delta e_1/2 (=\Delta e_3) + \Delta e_2$ as shown by the alternate long-and-two-short dash line in FIG. 11. When it can be regarded that $\Delta e_2 = 0$, the defocusing signal includes the error $\Delta e_1/2$ shown by the alternate long-and-short-dash line in FIG. 11. Therefore, the true value $v_0$ of the distance is $$v_0 = v - (\Delta v_1/\alpha + \Delta v_2) \qquad (1)$$

where $v$ is the measured distance by the defocusing signal. Therefore, the movement of the taking lens can be controlled by determining the true value $v_0$ from the measured value $v$ in the above equation, whereby the distance can be performed while moving the taking lens and the time required for focusing can be reduced.

Figure 12:
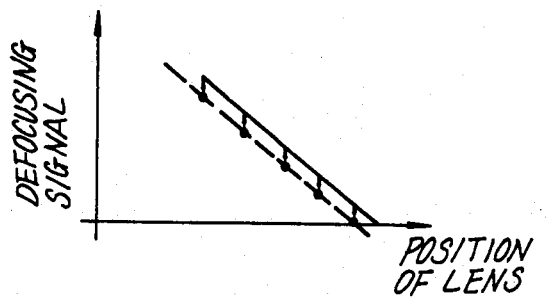
FIG. 12 is a graph showing the relationship between uncorrected defocusing signals and the position of a taking lens.

Referring to FIG. 12, there is shown the relationship between a defocusing signal whose errors are not corrected and the position of the taking lens. When the taking lens is stationary, the defocusing signal indicates the true value $v$ as shown by the broken line in FIG. 12. However, during the movement of the taking lens, the defocusing signal includes errors as indicated by the solid line (excluding the overlapping portions of the solid line and broken line overlap).

Figure 13:
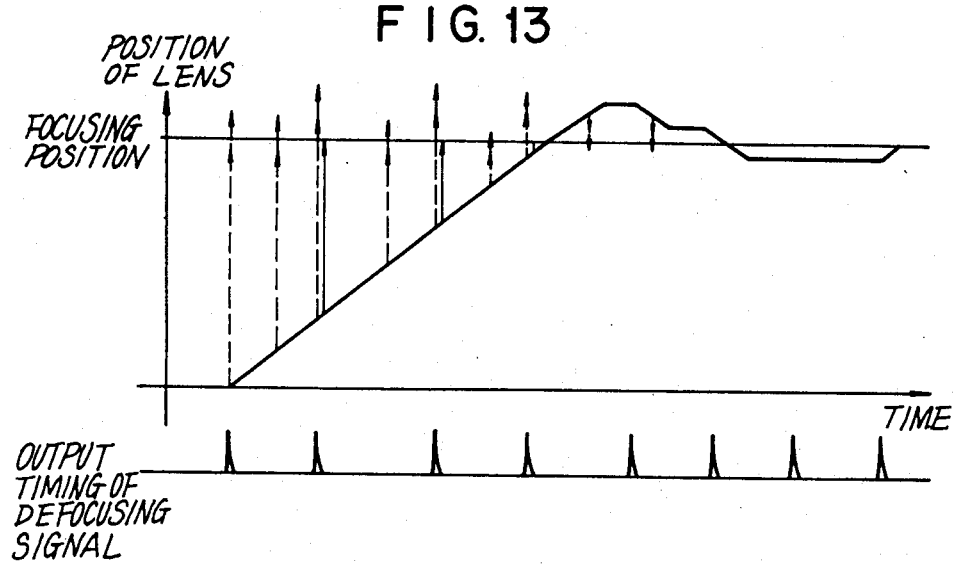
FIG. 13 is a diagram showing the movement of a taking lens.

FIG. 13 is a taking lens movement diagram. As shown by the broken line arrows, when the defocusing signal is uncorrected, the taking lens overruns the focusing position at least one time, taking a long time for focusing. In contrast to this, when the defocusing signal is corrected, the taking lens does not overrun the focusing psition as shown by the solid line arrow, so that the time required for focusing can be reduced.

Figure 14:
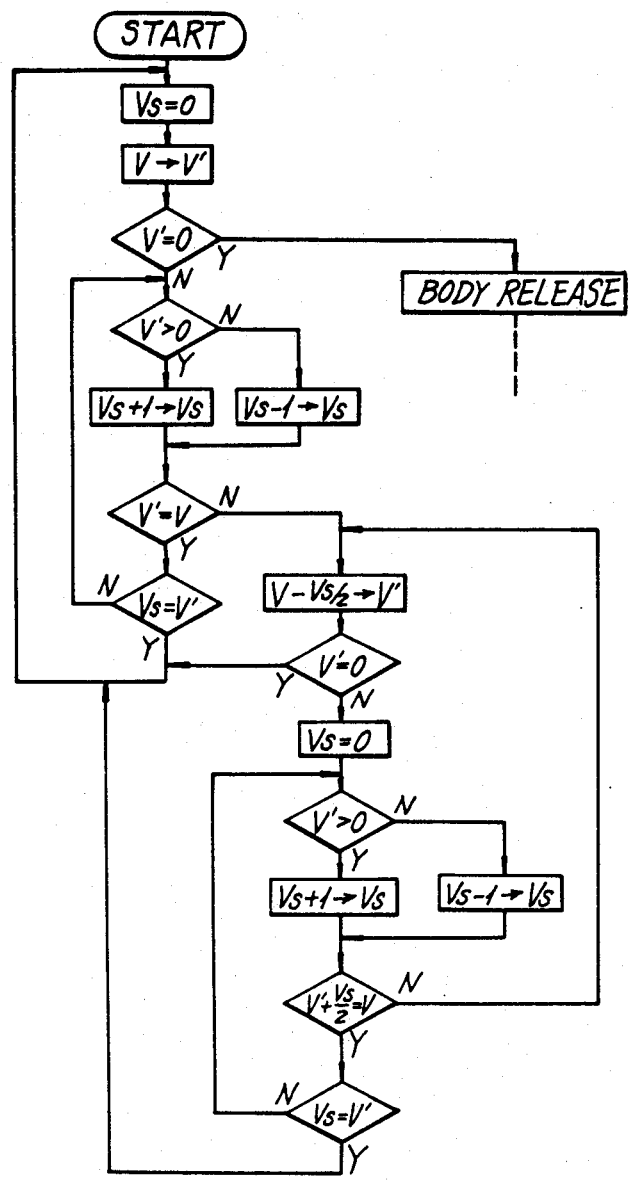
FIG. 14 is a flow chart showing the correction operation of distance measurement error which is caused by the movement of the taking lens in an automatic focusing position detection apparatus of the invention.

FIG. 14 shows part of the operation of the above-mentioned embodiment. In operation, a lens movement signal $V_s$ is first reset and the distance measurement is performed by stopping the taking lens and the measured value V is stored as the defocusing signal V'. When the value of the defocusing signal V' is zero, it means that the taking lens is located in the focusing position and therefore, the operation is moved onto the next body release step. When the value of the defocusing signal is not zero, the polarity of the defocusing signal is judged and the lens movement signal $V_s$ is shifted by one step and the taking lens is projected or withdrawn. When V' = V and a different measurement value has not been input to the control circuit 26, the taking lens is moved until $V_s$ becomes equal to V'. When a new different distance measured is input to the control circuit 26 and V' does not become equal to V, that measured distance value is the value obtained during the movement of the taking lens and therefore, correction of $V - V_2/2$ is performed so as to attain V = V'. If V' is zero, the operation is returned to the first step. However, if V' is not zero, it is assumed that $V_s = 0$ and the polarity of V' is judged, so that the lens movement signal Vs is shifted by one step and the taking lens is moved. When $V' + V_s/2 = V$ and the next measured distance has not been input, the taking lens is moved until $V_s$ becomes equal to V'. When the next measured distance is input, the measured value is corrected and the above-mentioned operation is repeated.

In conventional auto-focusing cameras and automatic exposure measurement cameras, a distance measurement system for detecting the focusing position and a photometric system for controlling exposure are separately incorporated in the cameras. Therefore, those cameras are costly and it is difficult to reduce their sizes.

As the photometric system for controlling exposure, the TTL system employing light which passes through the taking lens is in general use. As the exposure control system for controlling automatically, a variety of sophisticated systems, such as shutter speed priority automatic exposure system, aperture-priority automatic exposure system, and program system, are in general use.

The focusing position detection method by pupil division is shown in FIGS. 1 and 2 can be considered substantially the same as the method of measuring the brightness of object for the exposure control, since the brightness of an object is measured by use of light receiving elements, and the outputs of the light receiving elements of the focusing detection system can be used as the inputs to the exposure control system. However, in the pupil divisignal type distance measurement system for detecting the focusing position, each light receiving element is arranged so as to be capable of receiving light from the exit pupil portions 14A and 14B of the taking lens 13 in the peripheral area thereof and therefore, exposure measurement and distance measurement cannot be performed at shooting aperture. Therefore, exposure measurement and distance measurement have to be done at the maximum aperture.

Figure 15:
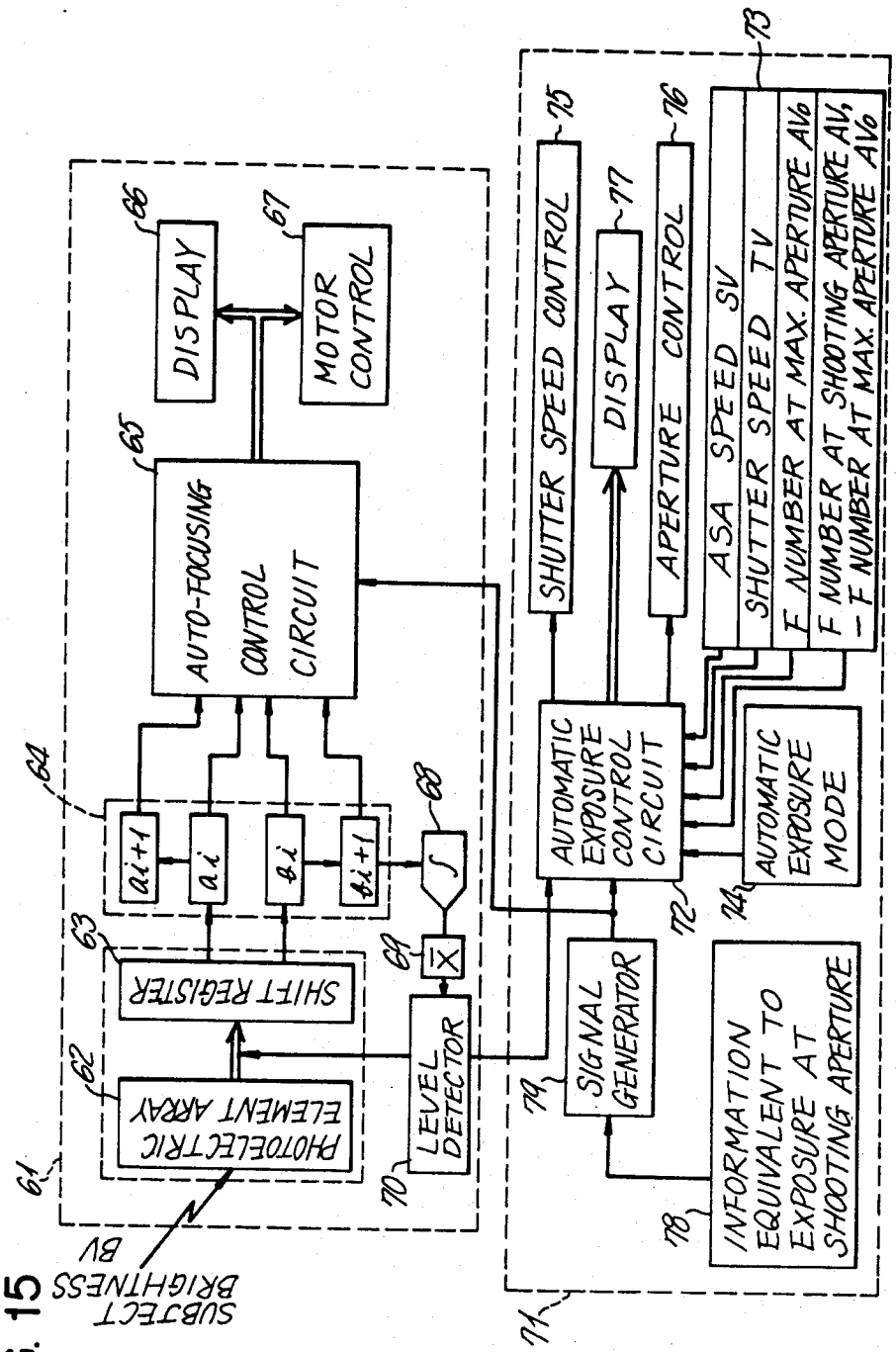
FIG. 15 is a block diagram of another embodiment of the invention.

Referring to FIG. 15, there is shown a block diagram of a focusing position detection system and an exposure control system for use in the embodiment of an automatic focusing position detection apparatus according to the invention. In the block diagram, the brightness BV of an object is measured by a photoelectric element array 62, such as a charge coupled device, disposed in a focusing position detection system 61. The thus-measured data are subjected to self-scanning by a shift register 63 and are then stored in a sample hold 64. The stored data are applied to an auto-focusing control circuit 65 for processing thereof. The detection results are displayed on a display device 66. Further, based on the detection results, the taking lens 13 is projected or withdrawn by a motor control device 67 to the focusing position. On the other hand, an integration value 68 is calculated from the output signals of the photoelectric elements of Group B, which are stored in the sample hold 64, and is then calculated the average value 69 of the output of the photoelectric elements of Group B, based on the integration value 68. The average value 69 is then compared with a reference value by a level detection apparatus 70. When the average value 69 is smaller than the reference value, a time signal is input to the shift register 63 and the output signals of the sample hold 64 are amplified to a level required for detecting the focusing position.

Since the output from the level detection apparatus 70 is substantially a signal indicating the brightness of the object, the output of the level detection apparatus 70 is input to an automatic exposure control circuit 72 of an exposure control system 71. In the automatic exposure control circuit 72, photometric information 73, including ASA speed SV, shutter speed TV, F-number $AV_0$ at maximum aperture and F-number AV at shooting aperture-F-number $AV_0$ at the maximum aperture are stored beforehand. In accordance with the switching of an automatic exposure mode 74, any of them in the photometric information 73 is selected and is then processed for operation in the automatic expsoure control circuit 72 and is output therefrom. Stated differently, when the exposure measurement mode is of a program type, SV and $AV_0$ are selected and used, and TV and AV are output. On the other hand, when the exposure measurement mode is of an aperture-priority type, SV and $AV-AV_0$ are selected and used, and TV is output. Furthermore, when the exposure measurement mode is of a shutter-priority mode, SV, TV and $AV_0$ are selected and used, and AV is output. The output TV and AV signals are respectively input to a shutter speed control apparatus 75 and an aperture control apparatus 76, whereby a shutter mechanism and an aperture mechanism are operated and the appropriate shutter speed and aperture are set in the camera. Those values are displayed in a display apparatus 77 such as a view finder.

When a taking lens for use in the conventional aperture-priority cameras is employed in the present invention, such taking lens has the following problem: The taking lens of the aperture-priority camera includes $AV-AV_0$ information in itself. Therefore, the information transferred between the taking lens and the body of the aperture-priority camera is not F-number AV at shooting aperture of the taking lens, but $AV-AV_0$. In other words, the information about how many steps (Exposure EV) the aperture should be narrowed down from the maximum aperture is transferred between the taking lens and the camera body. Therefore, in the case where F-number at the maximum aperture changes by exchanging the taking lens, the exposure changes as a matter of course, and such changes will bring about the change in the output of the light receiving elements.

When it is assumed that the output of each light receiving element corresponds to the brightness BV of object, the operation equation for the aperture-priority system is as follows:

$$(BV-AV_0)+SV=TV+(AV-AV_0) \qquad (2)$$

On the other hand, in the pupil divisional type distance measurement apparatus, each light receiving element is arranged so as to receive light from the peripheral portion of the exit pupil within the range in which light is not excluded at the maximum aperture of the taking lens. Therefore, even if the F-number $AV_0$ at the maximum aperture of the taking lens changes, the output of each light receiving element does not change. Therefore, the operation equation for this system is as follows:

$$BV+SV=TV+AV \qquad (3)$$

Thus, since the operation equation for the conventional aperture-priority taking lens differs from that for the pupil divisional type taking lens, the pupil divisional type light measurement cannot be performed by use of the aperture-priority type taking lens unless any modification thereof is done.

In order to make it possible to perform exposure measurement by the pupil divisional method, using an aperture-priority type taking lens, $AV_0$ information is input to the automatic exposure control circuit 72 so as to eliminate $AV_0$ information from the $AV-AV_0$ information of the aperture-priority taking lens, as indicated by the following equation:

$$BV+SV=TV+(AV-AV_0)+AV_0 \qquad (4)$$

Figure 16:
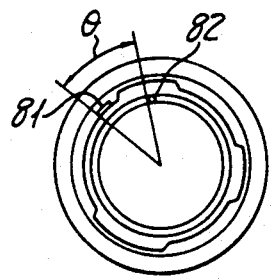
FIG. 16 is a schematic rear view of a taking lens which is provided with means of inputting $AV_0$ information in FIG. 15.
Figure 17:
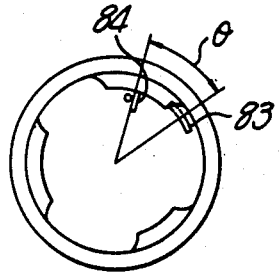
FIG. 17 is a schematic front view of the taking lens on the side of the camera body, which is provided with the means of inputting $AV_0$ information in FIG. 15.

The $AV_0$ information can be input to the automatic exposure control circuit 72, for instance, by operating manually a display dial attached to the body of the camera. However, it is more preferable that that information be automatically input to the automatic exposure control circuit 72 when a taking lens is mounted on the camera body. This can be done as follows: As shown in FIG. 16, an $AV_0$ information preset pin 82 is additionally attached to the taking lens at a position away from an $AV-AV_0$ information preset lever 81 by a rotation angle $\theta$. Likewise, as shown in FIG. 17, an $AV_0$ information introduction lever 84 is additionally attached to the camera body at a position away from an $AV-AV_0$ information introduction lever 83 by the rotation angle $\theta$, whereby the information of $AV-AV_0+AV_0=AV$ is automatically transmitted to the automatic exposure control circuit 72 when the taking lens is mounted on the camera body by rotating the taking lens by the rotation angle $\theta$.

As mentioned above, in the pupil divisional type distance measurement system, exposure measurement can be performed only at the maximum aperture, but it cannot be performed at shooting aperture. Therefore, when a taking lens which is used exclusively for exposure measurement at shooting aperture as well as when exposure measurement at shooting aperture is substantially done for preview or for close-up, exposure measurement and distance measurement cannot be performed correctly. Therefore, in this case, the operation of the auto focusing control circuit and automatic exposure control circuit is prohibited, displaying a warning to that effect. In the embodiment shown in FIG. 15, information equivalent to exposure at shooting aperture, 78, is input to a signal generator 79, and the output of the signal generator 79 is input to the automatic exposure control circuit 72 and to the auto focusing control circuit 65, whereby the operation of these circuits is prohibited and the prohibition warning is displayed in the displays 77, 66. The prohibition of those circuits can be performed by stopping the operation of the release button.

The pupil divisional type exposure measurement is spot exposure measurement in its character. Average exposure measurement and spot exposure measurement have their merits and demerits. However, some photographers prefer average exposure measurement to spot exposure measurement. When the average exposure measurement is preferred, the focusing position detected by spot exposure measurement is locked and a light diffusion plate is inserted before the light receiving element array in accordance with an exposure measurement mode signal, so that the light receiving element array receives light from the whole area of the exit pupil.

In order to make it possible to perform substantial exposure measurement at shooting aperture including a regular exposure measurement at shooting aperture, and average exposure measurement, additional light receiving elements for exclusive use in exposure measurement can be employed in the invention. More specifically, when distance measurement is performed, the light receiving elements of the pupil divisional type focusing position detection apparatus is employed, while when exposure measurement is performed, either the light receiving elements of the pupil divisional type focusing position detection apparatus or the above-mentioned additional light receiving elements are selected.

Figure 18:
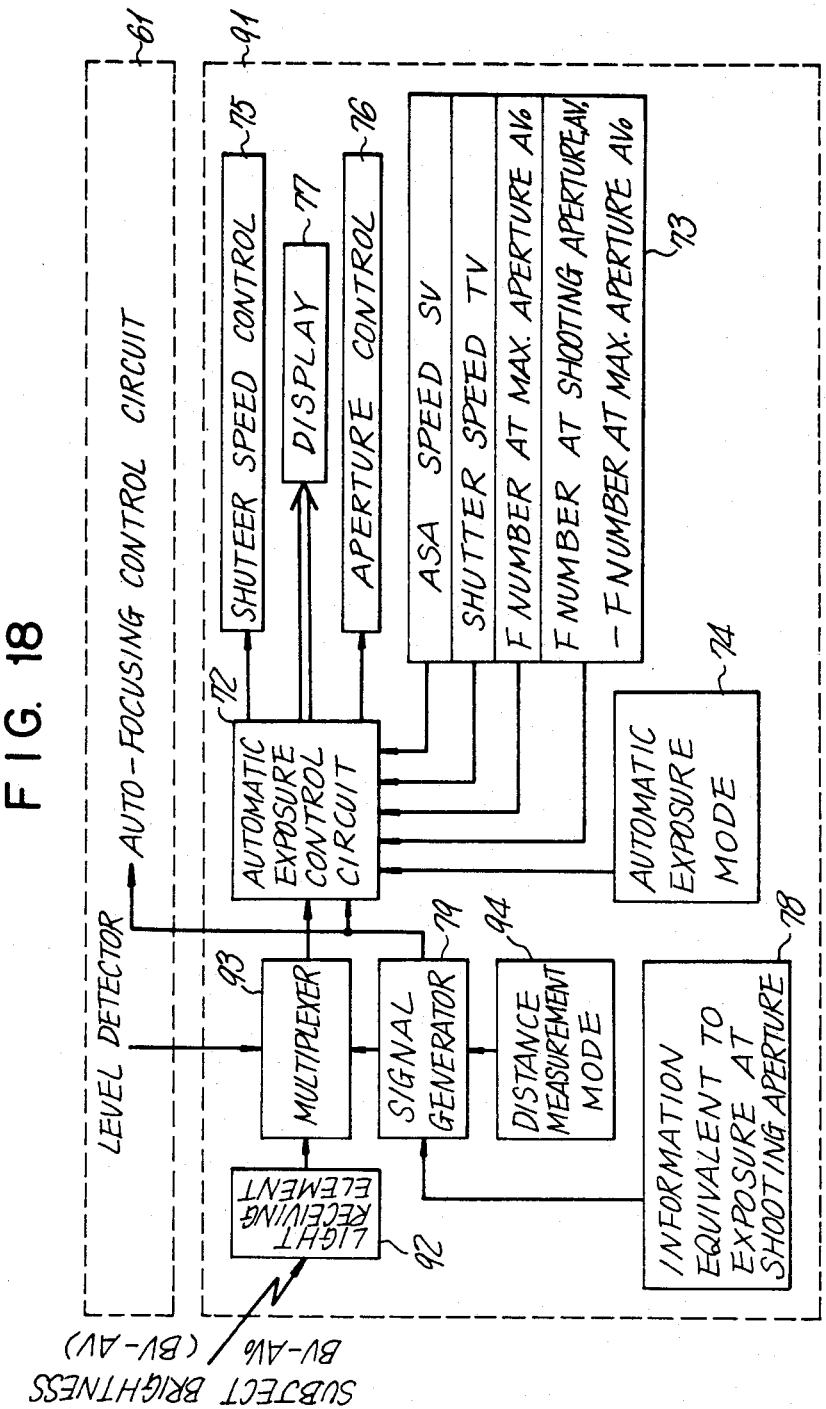
FIG. 18 is a block diagram of another embodiment of the invention.

Referring to FIG. 18, there is shown such an automatic exposure control system 91. In FIG. 18, the auto focusing system 61 is the same as that shown in FIG. 15. The output from an additional light receiving element array 92, which is, for example, constructed of silicon photodiodes arranged in an equivalent manner to the light receiving element array in the auto focusing control system 61 in FIG. 15, is input to a multiplexer 93, together with the output from a level detector 70 of the auto focusing control system 61, so that either the output from the additional light receiving element array 92 or the output from the level detector 70 is selected in the multiplexer 93, and is then output to the automatic exposure control circuit 72. As mentioned previously, the photometric information 73 has been preset and the necessary information is selected in accordance with the automatic exposure mode signal 74, so that a shutter speed signal and/or an aperture signal is input to their respective control systems 75, 76.

Figure 19:
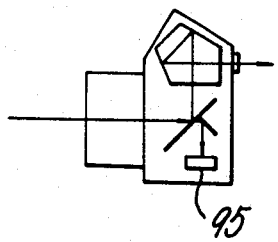
FIG. 19 is a schematic view of the arrangement of the photoelectric elements in the embodiments shown in FIGS. 15 and 17.

As a result, the automatic exposure control system 91 employing the additional light receiving elements 92 employing the additional light receiving elements 92 can perform the same exposure measurement as the TTL type exposure measurement for the conventional automatic exposure control and therefore the exposure measurement at the maximum aperture, the exposure measurement at shooting aperture, the average exposure measurement and spot exposure measurement can be performed. However, since the auto focusing control system 61 performs the exposure measurement at the maximum aperture and spot exposure measurement, it is preferable that the exposure measurement at shooting aperture and the average exposure measurement be adopted in the exposure control system 91. Of course, the spot exposure measurement can be adopted in the exposure control system 91 if the spot exposure measurement which is not for the auto focusing control system is adopted. The switching of exposure measurement from the exposure measurement at the maximum aperture by the auto focusing control system 61 to the exposure measurement at shooting aperture by the exposure control system 91 is performed by the multiplexer 93 in accordance with the output of the signal generator 79 to which the information equivalent to exposure at shooting aperture, 78, has been input. The operational equation for the above-mentioned operation is $(BV-AV)+SV=TV$. In this case, since the correct distance measurement by the auto focusing control system 61 becomes impossible, that information is transmitted from the signal generator 79 to the auto focusing control circuit 65, so that the operation of the auto focusing control circuit 65 is prohibited and a warning to that effect is displayed. Furthermore, the switching of exposure from the average exposure measurement to the spot exposure measurement and vice versa is performed by a signal output from the signal generator 79, which signal indicates the designated exposure measurement mode 94. As shown in FIG. 19, by disposing the auto focusing control system 61 and the exposure control system 91 at the optically equivalent position in such a manner as to be integral with a mix module 95, the auto focusing position detection apparatus can be made compact in size.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An automatic focusing position detection apparatus including a plurality of photoelectric element groups, each photoelectric element group capable of separately detecting light from an object, which is capable of detecting the focusing position by the output of said plurality of photoelectric element groups, comprising:

shift means for shifting the output signals from a first photoelectric element group of said photoelectric element groups relative to the output signals of a second photoelectric element group of said photoelectric element groups; and defocusing distance calculation means for calculating a defocusing distance from the correlation degree between the output signals of said first photoelectric element group and the output signals of said second photoelectric element group, which are relatively shifted to each other by said shift means, and from the relative shift distance of said two photoelectric element groups, wherein said defocusing distance calculation means comprises an integration device for multiplying the difference between the outputs of each pair of photoelectric elements of said first photoelectric element group and said second photoelectric element group which are relatively shifted to each other and integrating said difference.

2. An automatic focusing position detection apparatus as in claim 1, and further including mode setting means for producing a distance measurement mode setting signal, wherein said defocusing distance calculation means comprises first integration means for multiplying the difference between the outputs of each pair of photoelectric elements of said first photoelectric element group and said second photoelectric element group which are relatively shifted to each other, and second integration means for multiplying the difference between the output signals of the corresponding photoelectric elements in alternate two pairs of said first photoelectric element group and said second photoelectric element group, and integrating the difference between the multiplied values of said two pairs of the photoelectric elements, said first integration means and said second integration means being selectively employed in accordance with the distance measurement mode setting signal.

3. An automatic focusing position detection apparatus as in claim 1, capable of selecting either a far focusing position or near focusing position in accordance with a distance measurement mode setting signal.

4. An automatic focusing position detection apparatus including a plurality of photoelectric element groups, each photoelectric element group capable of separately detecting light from an object, which is capable of detecting the focusing position by the output of said plurality of photoelectric element groups, comprising:

shift means for shifting the output signals from a first photoelectric element group of said photoelectric element groups relative to the output signals of a second photoelectric element group of said photoelectric element groups; and defocusing distance calculation means for calculating a defocusing distance from the correlation degree between the output signals of said first photoelectric element group and the output signals of said second photoelectric element group, which are relatively shifted to each other by said shift means, and from the relative shift distance of said two photoelectric element groups, wherein said defocusing distance calculation means comprises an integration means for multiplying the difference between two alternate pairs of signals from said first photoelectric element group and said second photoelectric element group, and integrating the difference between the multiplied value of said two pairs of signals.

5. An automatic focusing position detection apparatus including a plurality of photoelectric element groups, each photoelectric element group capable of separately detecting light from an object, which is capable of detecting the focusing position by the output of said plurality of photoelectric element groups, comprising:

shift means for shifting the output signals from a first photoelectric element group of said photoelectric element groups relative to the output signals of a second photoelectric element group of said photoelectric element groups; and defocusing distance calculation means for calculating a defocusing distance from the correlation degree between the output signals of said first photoelectric element group and the output signals of said second photoelectric element group, which are relatively shifted to each other by said shift means, and from the relative shift distance of said two photoelectric element groups, and further comprising correction means for determining distance measurement errors caused by the movement of a taking lens and correcting the distance measurement errors.

6. An automatic focusing position detection apparatus as in claim 5, wherein said taking lens is driven at a predetermined constant speed.

7. An automatic focusing position detection apparatus as in claim 5, wherein the driving of said taking lens and the distance measurement are performed simultaneously and continuously.

8. An automatic focusing position detection apparatus including a plurality of photoelectric element groups, each photoelectric element group capable of separately detecting light from an object, which is capable of detecting the focusing position by the output of said plurality of photoelectric element groups, comprising:

shift means for shifting the output signals from a first photoelectric element group of said photoelectric element groups relative to the output signals of a second photoelectric element group of said photoelectric element groups; and defocusing distance calculation means for calculating a defocusing distance from the correlation degree between the output signals of said second photoelectric element group, which are relatively shifted to each other by said shift means, and from the relative shift distance of said two photoelectric element groups, and further comprising an exposure control system for controlling the value of the output signal of said photoelectric element groups and stopping means for stopping the operation of said focusing position detection system and said exposure control system in accordance with information equivalent to the exposure at the shooting aperture when exposure measurement at the shooting aperture is substantially performed by said camera.

* * * * *